US008655683B2

(12) United States Patent
Grundel et al.

(10) Patent No.: US 8,655,683 B2
(45) Date of Patent: Feb. 18, 2014

(54) REMOTE CONTENTS ESTIMATING SYSTEM AND METHOD

(75) Inventors: Lev Grundel, Vernon Hills, IL (US); Mark Steven Woods, Hoffman Estates, IL (US); Torpum Jannak, Palatine, IL (US); Steven Michael Miller, Algonquin, IL (US)

(73) Assignee: Allstate Insurance Company, Northbrook, IL (US)

( * ) Notice: Subject to any disclaimer, the term of this patent is extended or adjusted under 35 U.S.C. 154(b) by 1931 days.

(21) Appl. No.: 10/357,511

(22) Filed: Feb. 4, 2003

(65) Prior Publication Data
US 2004/0153346 A1    Aug. 5, 2004

(51) Int. Cl.
*G06Q 10/00* (2012.01)
*G06Q 50/00* (2012.01)
*G06Q 40/00* (2012.01)

(52) U.S. Cl.
USPC ........................................ 705/4; 705/2; 705/3

(58) Field of Classification Search
USPC .......................................................... 705/2–4
See application file for complete search history.

(56) References Cited

U.S. PATENT DOCUMENTS

| 5,905,988 | A |   | 5/1999  | Schwartz et al. |
|-----------|---|---|---------|-----------------|
| 5,930,512 | A |   | 7/1999  | Boden et al. |
| 5,950,169 | A | * | 9/1999  | Borghesi et al. .................. 705/4 |
| 5,963,952 | A |   | 10/1999 | Smith |
| 5,991,760 | A |   | 11/1999 | Gauvin et al. |
| 6,029,182 | A |   | 2/2000  | Nehab et al. |
| 6,061,686 | A |   | 5/2000  | Gauvin et al. |
| 6,061,691 | A | * | 5/2000  | Fox ........................................ 1/1 |
| 6,470,303 | B2| * | 10/2002 | Kidd et al. ......................... 703/8 |
| 2002/0035488 | A1 | * | 3/2002  | Aquila et al. ..................... 705/4 |
| 2002/0052765 | A1 | * | 5/2002  | Taylor ................................ 705/4 |
| 2002/0184104 | A1 | * | 12/2002 | Littman ........................... 705/26 |
| 2003/0028404 | A1 | * | 2/2003  | Herron et al. ..................... 705/4 |
| 2003/0154111 | A1 | * | 8/2003  | Dutra et al. ....................... 705/4 |

OTHER PUBLICATIONS

Dumm, Randy E., et al., "An Analysis of Gross Rates of Recovery in the Auto Salvage Marketplace", CPCU eJournal, Dec. 2002, vol. 55, Issue 10, pp. 1-14.*

* cited by examiner

*Primary Examiner* — Jason Dunham
*Assistant Examiner* — Amber A Misiaszek
(74) *Attorney, Agent, or Firm* — Banner & Witcoff, Ltd.

(57) ABSTRACT

A contents estimating system and method for providing an estimate of the cost of settling an insurance claim which includes a server having an embedded program compiled on the server and embedded in a web page, a client having a browser removably connected to the server, an inventory data acquirer for acquiring inventory data of each of the items that are the subject of the insurance claim and insert them into the web page, a price data acquirer for acquiring prices of the items of inventory data that are the subject of the insurance claim and insert them into the web page, and a liability limits data acquirer for acquiring liability limits data for the insurance claim and insert them into the web page, in which, upon receipt of a claim of loss from the insured, the web page is displayed on the screen of the client, the embedded program is executed within a client process with substantially unrestricted access to the client's system resources, and an estimate of the cost of settling a claim is produced by mapping an item of the inventory data to the price data, subject to the liability limits data, and is provided to the insured upon calculation, at the insured's location or the location of the loss.

10 Claims, 12 Drawing Sheets

FIG. 12

REMOTE CONTENTS ESTIMATING SYSTEM AND METHOD

BACKGROUND OF THE INVENTION

1. Field of the Invention

The present invention relates generally to a contents estimating system for insurance claim processing in which an estimate of the cost of settling an insurance claim is made and reviewed by an insured at the insured's location or the location of the loss.

2. Background and Related Art

It has long been desirable to produce an estimate of the cost of settling an insurance claim, and to communicate that cost to the insured, as quickly and accurately as possible. The cost of settling an insurance claim becomes a benefit payable to the insured from the insured's point of view. The insured is consequently anxious to receive it.

Suffering losses is a traumatic event for an insured. A loss of ones personal belongings due, for example, to theft, fire or vandalism may well leave the insured feeling devastated and violated. An insurer can help alleviate the insured's suffering by offering information about how the loss will be rectified. Such information offers the insured a basis for planning, a starting point, and resources to use and a path to take towards resumption of the insured's normal affairs. Such information is time-sensitive in that it is most valuable immediately upon discovery by the insured of his or her loss, and loses value as time goes on. An estimate of the cost of settling an insurance claim delivered a week after a loss, for example, is less valuable to the insured than an estimate delivered the day after, especially if the insured has called the insurer several times in the interim. The speed with which an insurance adjuster reacts by providing the insured with an estimate of the cost of settling an insurance claim is thus a positive benefit that is readily apparent to the insured. It is therefore desirable from a competitive business standpoint to communicate an estimate of the cost of settling a claim to the insured as quickly and accurately as possible.

Furthermore, an estimate of the cost of settling a claim is communicated ideally in a face-to-face meeting, preferably immediately upon discovery of the loss, since the chance of mis-communication and delays due to mail delivery time, telephone contact time, and other events are thereby reduced. Such a face-to-face meeting may occur at the insured's location or the location at which the loss occurred. An insurance adjuster however, should not expect to make use of the insured's facilities such as telephones when visiting the insured at the insured's location or the location at which the loss occurred. First of all, the insured may not have a telephone or electricity if, for example, the loss resulted from a major disaster such as a fire or a hurricane. And even if the insured has such facilities, it is better from a business standpoint to avoid using them, if possible. Thus there exists a need for an apparatus and method to estimate the cost of settling an insurance claim at the insured's location or the location at which the loss occurred which avoids the need to use the insured's resources.

Systems to estimate the cost of settling an insurance claim are commonly understood to be contents estimating systems. Contents estimating systems, however, have heretofore been dependent on a dedicated connection to a central data storage and analysis facility. Such contents estimating systems are therefore unsuitable for disconnectable contents estimation, where access to a central data storage and analysis facility was unavailable, difficult, or otherwise discouraged.

Contents estimation is often conducted, at least initially, by phone. The insured calls the insurer upon discovery of an insured loss, or shortly thereafter, and communicates to the insurer a list of the lost items. The lost items are often organized and listed by the rooms of a house as a memory aid, and to help the insured visualize the lost items. The insurer then refers to pricing resources such as 'Insurer's World®' or retail price data to estimate the cost of replacing the lost items. The insurer applies depreciation and taxes to the costs, producing an estimate of the cost of settling the insurance claim, which is then communicated to the insured. Since the known contents estimating systems rely on sources of information that are necessarily centrally located, such contents estimation would be difficult to do at the insured's location or at the location of the loss.

Since the contents estimation process is relatively time consuming, such contents estimation would generally be done after the conversation with the insured has ended. The estimate of the cost of settling the insurance claim would then be communicated to the insured by phone or mail, or carried to the insured's site by a claims adjuster, necessitating a delay in the claims settlement process. If the insured has neglected to list items, or if the listed contents are otherwise incomplete or contain errors, the contents estimation must be performed again at the central location, at least with respect to the new or corrected items. Such further contents estimation entails delays that annoy and frustrate the insured. It is therefore desirable to be able to deliver an accurate estimate of the cost of settling a claim at the insured's location or the location at which the loss occurred, without resorting further to a central database.

A related technology is exemplified by U.S. Pat. No. 6,029,182 to Nehab, et al., incorporated herein by reference. Nehab describes a data retrieval system for the World Wide Web. Nehab retrieves information automatically from hypermedia documents based on a match between the structure of the documents and a personalized data retrieval structure.

A second related technology is exemplified by U.S. Pat. Nos. 6,061,686 and 5,991,760 to Gauvin, et al., the disclosures of which are incorporated herein by reference. Gauvin describes a system of updating a copy of a remote document stored on a client computing system when the client computer is connected to a network. In Gauvin, for example, a copy of a remote document is downloaded to a client computer upon command. The copy is accessible and modifiable on the client computer while the client computer is disconnected from the network. The copy is then updated periodically whenever the local computer re-connects to keep it in conformance with the remote document.

A third related technology is exemplified by U.S. Pat. No. 5,963,952 to Smith, the disclosure of which is incorporated herein by reference. Smith describes a disconnect/connect Internet browser based data entry system in which the browser stores a file locally for later viewing.

A fourth related technology is exemplified by U.S. Pat. No. 5,930,512 to Boden, et al., the disclosure of which is incorporated herein by reference. Boden describes an automated system of process modeling using both a web server and a workflow server for process definition. Boden is concerned with connecting Internet servers and workflow servers so as to provide a workflow server, which utilizes Internet resources. Boden uses a workflow insurance process as an example. Boden models an application for life insurance through the sales and the underwriting departments of an insurance company.

A fifth related technology is exemplified by U.S. Pat. No. 5,905,988 to Schwartz, et al. the disclosure of which is incorporated herein by reference. Schwartz describes transforming database information into a presentation network topology for seamless serial presentation of selected data items to a user.

SUMMARY OF THE INVENTION

The present invention provides a computer implemented contents estimating system in which an insurance claim can be inventoried, reviewed, and adjusted at the insured's location or at the location of the loss. The system acquires prices corresponding to items in the claim inventory and can map the claim inventory to prices and generate an estimate of the cost of settling the claim. Access to a price database may, for example, be by remote memory device in a fully disconnected state, by wireless communication in a remotely-connected state, or by wired connection (e.g., telephone modem or direction connection to a network). In the context of the present disclosure, disconnected means the contents estimating system is unconnected (i.e., neither a wired or wireless connection) or untethered from any central database, such as, for example, an application server, middle-tier, web server, or data store.

In particular, the present invention provides a computer implemented remote contents estimating system which includes a server having a compiled programming module which is embedded in a web page, a client having a browser removably connected to the server, a price data acquirer associated with the server to acquire price data and insert in the web page, an initial inventory data acquirer associated with the server to acquire claims data from an insured and insert in the web page, including initial inventory data of items that are the subject of the insurance claim, a liability limits data acquirer associated with the server to acquire liability limits data and insert in the web page, in which the web page is displayed on a screen of the client, the embedded program may be executed within a client process with substantially unrestricted access to the client's system resources, and an estimate of the cost of settling a claim may be produced by mapping items of the inventory data to the price data, subject to the liability limits data, which may be provided via the client to the insured upon calculation, at the insured's location or the location of the loss.

The present invention provides further a computer implemented remote contents estimating system in which, upon receipt of supplemental inventory data from the insured, a revised estimate of the cost of settling a claim may be produced by the client by mapping items of the initial inventory data and the supplemental inventory data to the price data, subject to the liability limits data, and provided via the client to the insured upon calculation by the client, at the insured's location or the location of the loss.

The present invention further provides a computer implemented method of remote contents estimating in which a compiled programming module or component having substantially unrestricted access to the client's resources, may be placed on a server and embedded in a web page, and, upon receipt of a claim of loss by an adjuster from the insured, price data for items of inventory data that are the subject of the insurance claim and liability limits data for the insurance claim are acquired and inserted in the web page, and may be taken to the insured's location or the location of the loss, at which location supplemental inventory data of further items that are the subject of the insurance claim may be acquired, at which time each item of the inventory data may be mapped to the price data to produce an estimate of the cost of settling the claim and inserting that in the web page, and displaying the web page on a screen of a client, and the embedded program may be executed within a client process with substantially unrestricted access to the client's system resources, and capping the estimate by the liability limits data and providing it to the insured upon calculation, at the insured's location or the location of the loss.

BRIEF DESCRIPTION OF THE DRAWINGS

The invention will be described in detail with reference to the following drawings, in which:

FIGS. 10, 11, and 12 are screen shots associated with a remote contents estimating system according to an embodiment of the present invention;

DETAILED DESCRIPTION OF PREFERRED EMBODIMENTS

Figure 1:
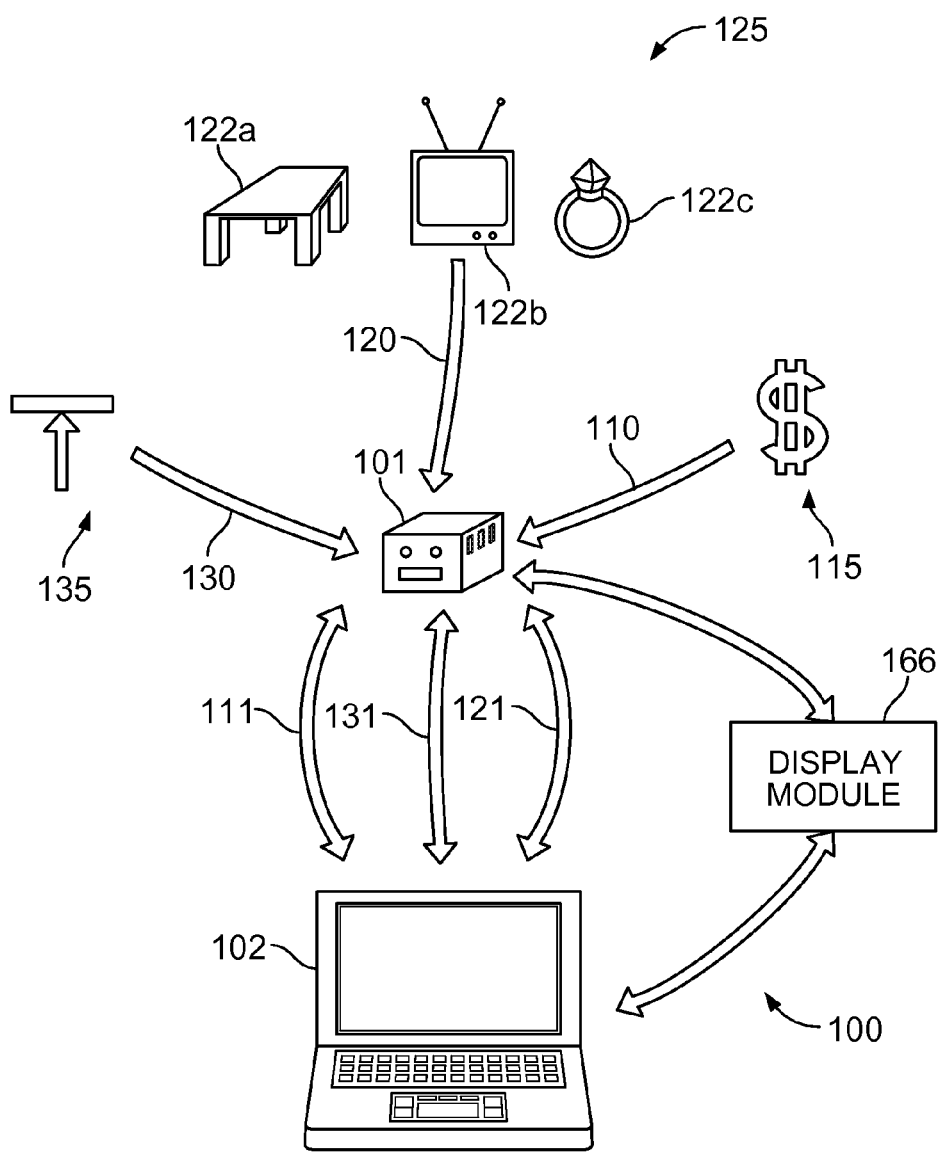
FIGS. 1, 2, 3, and 4 are block diagrams of a remote contents estimating system according to an embodiment of the present invention.

FIG. 1 shows a remote contents estimating system 100 according to an embodiment of the present invention. In one embodiment, the system is disconnectable. The term 'disconnectable' as used herein refers to possession of the capability of operating in an off-line, stand-alone, or untethered mode. The remote contents estimating system 100 includes a server 101, a client 102, an inventory data acquirer 120 associated with server 101 for acquiring inventory data 125 of each of the items 122 (e.g., furniture 122a, electronics 122b, jewelry 122c) that are the subject of the insurance claim, a price data acquirer 110 associated with server 101 for acquiring price data 115 for the items 122 of inventory data that are the subject of the insurance claim, a liability limits data acquirer 130 associated with server 101 for acquiring liability limits data 135 for the insurance claim, price data transfers 111 of price data 115 between the server 101 and the client 102, inventory data transfers 121 of inventory data 125 between the server 101 and the client 102, and liability limits data transfers 131 of liability limits data 135 between the server 101 and the client 102.

Figure 2:
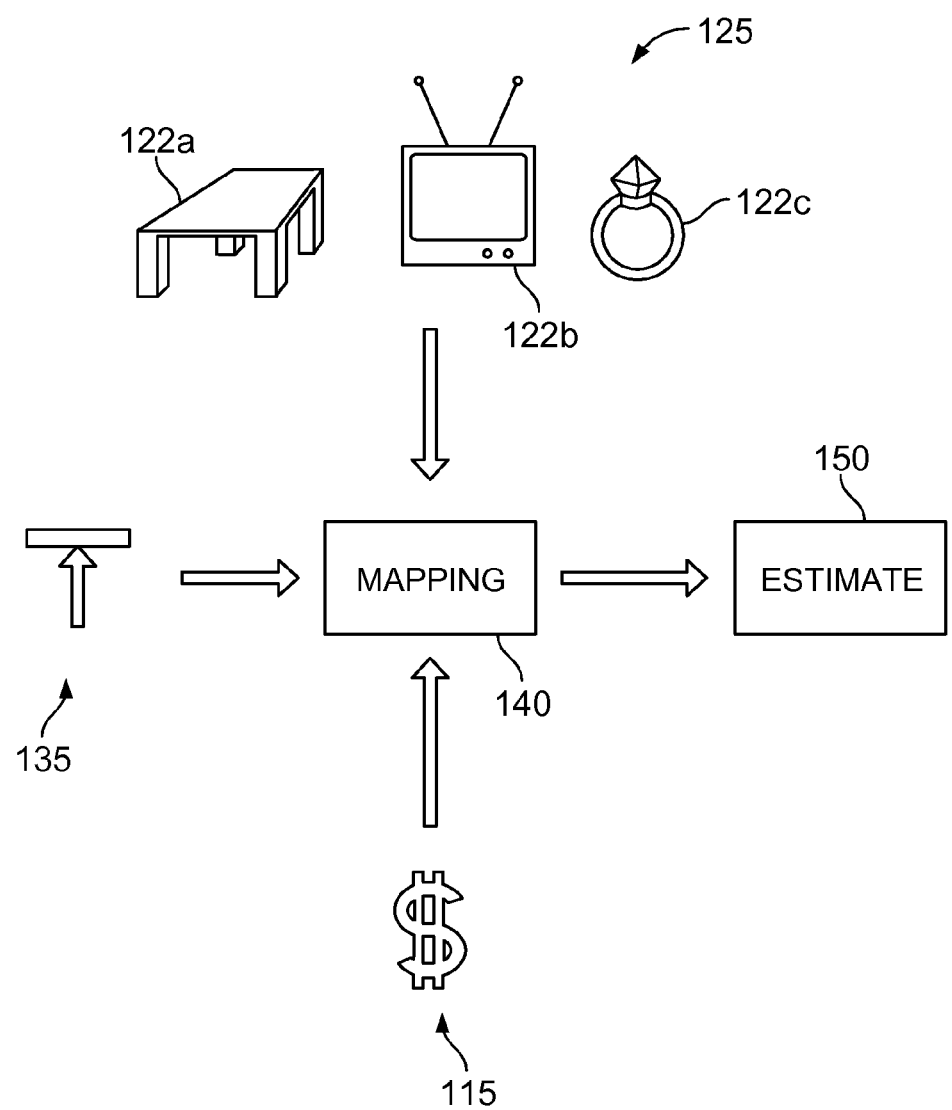

FIG. 2 shows a mapping module 140 in which an estimate 150 of the cost of settling a claim may be produced by mapping items 122a-c of the inventory data 125 to the price data 115, subject to the liability limits data 135. Each item 122a-c may be mapped to price data 115 to produce estimate 150. The estimate 150 may then be provided to the insured upon calculation, at the insured's location or at the location of the loss. The estimate can be generated and supplied to the insured at the insured's location or at the location of the loss if the price data 115, which can be an extremely large database, that is, preferably, updated on a regular basis if the price data 115 is remotely accessible to client 102 while the client 102 is disconnected from server 101. The price data 115 can be made remotely accessible (1) by making the data 115 itself portable by storing it on a portable memory device, such as expanded hard drive and/or CD-ROM, (2) by providing, where available, remote wired connection, e.g., by telephone modem, between the client 101 and the server 102 or other central database, or (3) by wireless data transmission, e.g. by a wireless modem or by a conventional modem connected to a cellular telephone, between the client 102 and the server 101 or other central database.

Figure 3:
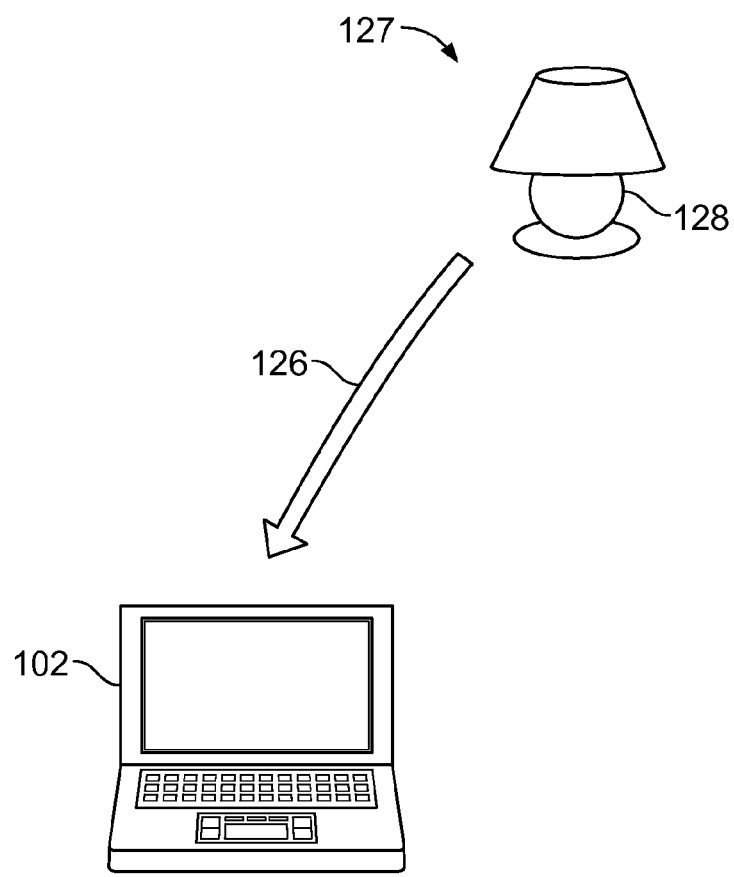

In a preferred embodiment of the remote contents estimating system 100, the inventory data acquirer 120 includes an initial inventory data acquirer for acquiring initial inventory data reported to a claims adjuster when a claim is first made and a supplemental inventory data acquirer for acquiring supplemental inventory data reported, or claimed, subsequently to acquisition of the initial inventory data. As shown in FIG. 3, a supplemental inventory data acquirer 126 associated with client 102 for acquiring supplemental inventory data 127 of items 128 that are the subject of the insurance claim, but were not included in initial inventory data 125. If, for example, the insured becomes aware of further items 128 that were lost after the initial inventory data 125 has been used to produce an estimate 150, such supplemental inventory data 127 may be used to adjust inventory data 125, which would already include the initial inventory data, to reflect the further items 128, such as by adding supplemental inventory data 127 to initial inventory data. A revised estimate of the cost of settling a claim may be produced by the client 102 by mapping the inventory data 125, including the initial inventory data and the supplemental inventory data 127, to the price data 115, subject to the liability limits data 135. The revised estimate provided via the client 102 to said insured upon calculation by the client 102.

Ideally, the supplemental inventory data 127 may be accessible to client 102 while it is disconnected from server 101, such as at the insured's location or at the location of the loss. If price data 115, or an appropriate subset thereof, is also accessible to client 102 while it is disconnected from server 101, i.e., by portable memory device, such as expanded hard drive and/or CD-ROM, estimate 150 can be adjusted based on supplemental inventory data 127 while client 102 is disconnected from server 101, such as at the insured's location or the location of the loss. Remote estimates may also be made at the insured's location or at the place of loss if access to the price data 115 via the server 101 can be accomplished by wireless data transmission. Item 128 may be similar to items 122a-c, except for the time at which the inventory data was acquired.

Figure 4:
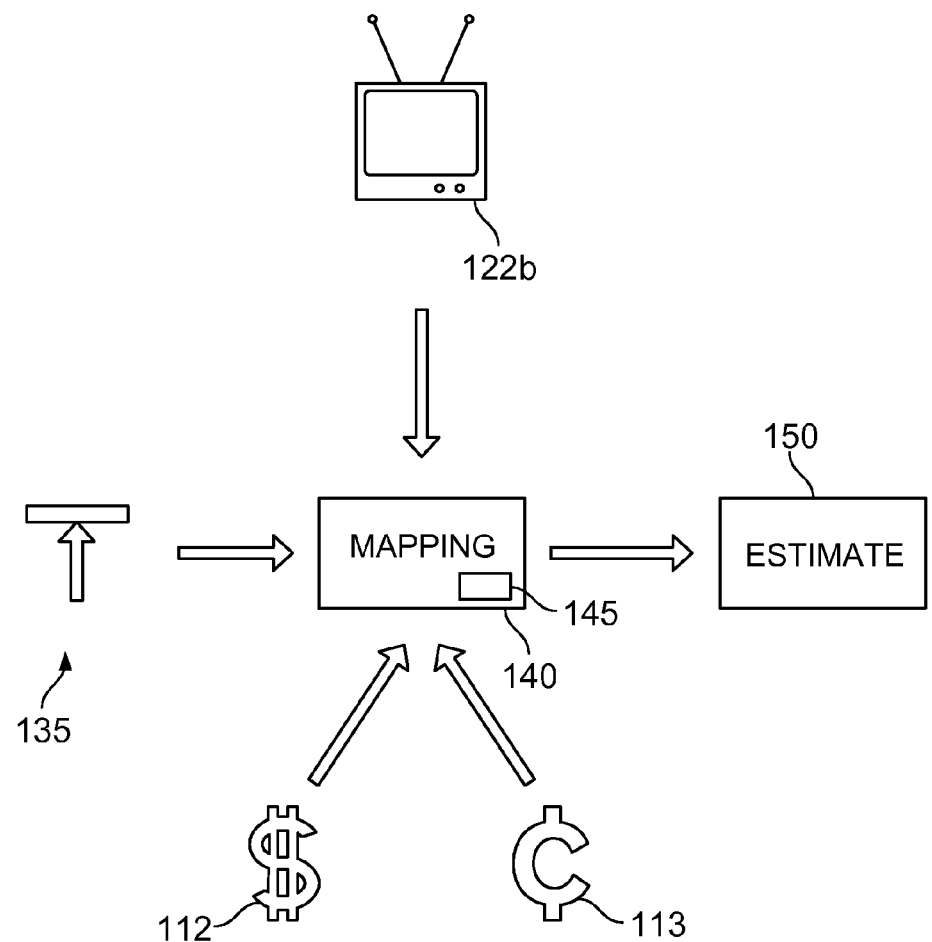

As shown in FIG. 4, the remote contents estimating system 100 further includes a lowest price selector 145. Lowest price selector 145 selects a lowest price of two or more prices 112, 113 to use to produce estimate 150 if an item 122b of inventory data 125 happens to map to two or more prices 112, 113 in the price data 115. Both prices 112, 113 preferably are shown on the client 102. A particular item 122b may map to two or more prices if, for example, the item 122b may be available from two or more vendors, in which case the lowest price is chosen generally.

The operation of the remote contents estimating system 100 will now be described with reference to FIGS. 1 through 4. An insured contacts an insurer upon suffering a loss. The insured provides a list of the items 122 that have been lost, for which compensation may be claimed. The items 122a-c are converted to inventory data 125 via the inventory data acquirer 120, and, in particular, the items 122a-c are converted into initial inventory data via the initial inventory data acquirer component of the inventory data acquirer 120. The insured may contact the insurer by phone, or the insurer may visit the insured at the insured's location or the location of the loss, or both. The items 122a-c that are the subject of the claim may be categorized by room (as well as other categories, such as, clothing, electronics, furniture, jewelry, etc) as a visualization aid for the insured. The insurer may ask the insured, for example, to imagine the way their living room looked, and tally up the items 122 therein. The term 'loss' as used herein includes actual physical losses as well as damage, up to and including damage so severe that further use may be impossible.

The insurer compiles price data 115 for the items 122a-c of the inventory data 125 via the price data acquirer 110. Price data 115 may be accessible to server 101 and is preferably accessible to client 102 as well. The price data 115 are mapped to the items 122, so that each one of items 122 has an associated value. The price data 115 associated with a particular item 122b may be depreciated or otherwise adjusted, as appropriate.

The sum of the values of the items 122 may be compared to any liability limits data 135, acquired by the liability limits data acquirer 130, that may be in force under the insured's policy, and adjusted appropriately. If, for example, the insured's policy includes a deductible, the sum of price data 115 may be reduced by that amount. The sum of the values comprises an estimate 150 of the cost of settling the insurance claim.

As explained above, the estimate 150 may be accessible to server 101 and to client 102 in connected as well as in disconnected mode. Client 102 may be disconnected from server 101 to conveniently provide the estimate 150 to the insured, such as at the insured's location or at the location of the loss. If price data 115, liability limit data 135, and/or the mapping function 140 are not available to the client 102 in a disconnected mode, the client 102 must be connected (by wire or wireless data connection) to the server 101, or other central database to generate the clam settlement estimate 150.

If, upon further review, the insured realizes that items 128 were left out of the initial claim, supplemental inventory data 127 corresponding to item 128, acquired via supplemental data inventory acquirer 126, can be added to the list of items 122. Supplemental inventory data 127 collected for items 128 can then be mapped 140 to price data 115, subject to liability limits data 135, and a new, updated estimate 150 produced for the insured.

Supplemental inventory data 127 and estimate 150 may also be uploaded to server 101 when client 102 is reconnected to server 101. Client 102 and server 101 may be synchronized upon reconnection, i.e. the most recent or most accurate list of items 122 may be retained on both client 102 and server 101.

Estimate 150 may be based on the depreciated value of item 122b, but settlement options such as replacement of item 122b, an allowance towards the replacement of item 122b, cleaning item 122b, repair of item 122b, the actual cash valuation (ACV) of item 122b, or the full replacement cost (FRC) of item 122b, or any equivalent settlement option, may also be used. Estimate 150 may also be stored for future reference.

The difference between the FRC of an item 122b and the ACV of item 122b may be calculated. This might be done, if, for example the insured receives the ACV of item 122b as compensation, but has coverage for the FRC of item 122b. The insured might then receive the difference between the FRC of item 122b and the ACV of item 122b at a later date.

Server 101 may be a WinTel-based computer, but server 101 may also be a mainframe computer, a network server, a personal computer, a laptop computer, a notebook computer, a handheld computer, a palmtop computer, a game console, a mini-computer, a micro-computer, a digital computer, an organic computer, an emulator, or any equivalent device.

Client 102 may be a WinTel-based computer, but client 102 may also be a laptop computer, a personal computer, a notebook computer, a handheld computer, a palmtop computer, a game console, a mini-computer, a micro-computer, a digital computer, an organic computer, an emulator, or any equivalent device. Client 102 may be removably connected to server 101 by a data transfer or communication link. Thus client 102 may be linked to server 101 for data transfer or communication purposes, or it may operate independently.

Price data acquirer 110 acquires price data 115 by retrieving it from a database, but it also may be downloaded from a web site, input, read from a file, received from a transmitter, derived, fabricated, or acquired by any equivalent means of acquisition. In the case of supplemental inventory data 127 corresponding to supplemental items 128, price data 115 should preferably be extensive enough to contain prices for substantially all of the possible supplemental items 128 that are likely to have been lost. This may be especially important for mapping a supplemental inventory data 127 to price data 115, for example, at the insured's location or the location of the loss, since the price data 115 will have been acquired beforehand and transferred there. Those skilled in the art of settling claims may be able to predict from experience the nature of supplemental items 128 that are likely to have been lost. A majority of people, for example, own certain items such as televisions or lamps. Prices for a supplemental items 128 of an odd or a rare nature may of course not be contained in price data 115.

Price data 115 may be regional price data, national price data, global price data, manufacturer's suggested retail price data, economic value data, future price data, historical price data, equivalent item price data, complementary item price data, wholesale price data, retail price data, replacement cost, cleaning expense, repair expense, or any equivalent measure of the cost of making the insured whole. The regional price data may be selected based on the insured's zip code.

Also in one embodiment price data acquirer 110 for acquiring price data 115 further comprises a keyword searcher. In a further preferred embodiment the source of price data 115 may be shown. In a still further preferred embodiment a vendor name, vendor identification number, vendor address, vendor phone number, or any equivalent means of identification may identify the source of the price data 115.

Price data 115 may be adjusted using a factor, such as age-based depreciation, usage-based depreciation, cost-based depreciation, taxable status such as tax rate, or other equivalent adjustment factors. The adjustment of price data 115 can, alternatively, be overridden. The taxable status adjustment factor, if employed, would be determined based on the insured's zip code, but it may also be determined based on ACV, FRC, market value, local regulations, municipal regulations, state regulations, or any other equivalent determinant. Price data 115 may be available locally on the client for untethered operation.

Initial inventory data acquirer 120 acquires initial inventory data 125 when a claim is received, such as through manual keyboard entry, scanning a bar code list, voice recognition data entry, or other means of data entry, but it may also be downloaded from a web site, read from a file, received from a transmitter, derived, fabricated, or any equivalent means of acquisition. Initial inventory data acquirer 120 for acquiring initial inventory data 125 preferably maintains the order in which items 122 were entered, detects redundant entries, and identifies the product manufacturer of items 122*a-c* of initial inventory data 125.

The product manufacturer of item 122*a, b*, or *c* of initial inventory data 125 may be identified by a vendor-specific identifier, a serial number, a brand, a model, a year, a feature, a price, a description, an image, a bar code, a label, a component, or any equivalent characteristic or unique identifier. Inventory data 125 may be available locally on the client for untethered operation after acquisition by the initial inventory data acquirer 120. Initial inventory data acquirer 120 for acquiring inventory data 125 compiles reports of items 121 in inventory data 125 which may include a statistic that characterizes inventory data 125, such as, a claim frequency, claim history, payout history, default history, similar claims in the same locality, similar claims by similar businesses, claims by peril, a complementary item, a supplementary item, trend analysis, most common loss items, measurement of savings, history per estimate, or other equivalent characteristics.

Liability limits data acquirer 130 retrieves liability limits data 135 from a database, or the liability limits data 135 may be downloaded from a web site, input by any suitable data input methodology, read from a file, received from a transmitter, derived, fabricated, or acquired using any equivalent means. In one embodiment liability limits data 135 may be available locally on the client for untethered operation.

Liability limits data acquirer 130 for acquiring liability limits data 135 also tracks and applies applicable deductibles and tracks and applies advance payments. The deductible may have been, for example, waived.

Liability limits data 135 defaults to a deductible, which may be based on an applied category limit or sub-limit, which may be applied automatically. A category limit or sub-limit may be defined by a peril code. In another embodiment, a category limit or sub-limit may be defined by policy type. A category limit or sub-limit can, alternatively, be overridden.

Price data acquirer 110 associated with server 101 for acquiring price data 115 may be a web search engine, a database query, or any equivalent search means. Inventory data acquirer 120 for acquiring inventory data 125 uses keyboard entry, but it could also use voice recognition, character recognition, a file read, a file copy, a file download, a file transfer, or any equivalent means of acquisition. Liability limits data acquirer 130 for acquiring liability limits data 135 may be a file read, but it could also be a keyboard entry, a file copy, a file download, a file transfer, or any equivalent means of acquisition.

Price data transfer 111 may be accomplished by downloading the price data 115 via a hypertext file capture. Alternatively, price data transfer 111 can be accomplished by keyboard entry, a file copy, a file download, a file transfer, or any equivalent means of data transfer. Inventory data transfer 121 may be accomplished by uploading or downloading the inventory data 125 via storing a hypertext file on the server 101 or the client 102, but it could also be a keyboard entry, a file copy, a file download, a file upload, a file transfer, or any equivalent means of file transfer. Liability limits data transfer 131 may be accomplished by downloading the liability limits data 135 from the server 101 to the client 102 by a file transfer, but it could also be a keyboard entry, a file copy, a file download, or any equivalent means of file transfer.

Mapping module 140, in which an estimate 150 of the cost of settling a claim may be produced by mapping an item 122*a, b*, or *c* of the initial inventory data 125 to the price data 115, subject to the liability limits data 135, may be embodied in a software program. Lowest price selector 145 for selecting the lowest price when the item 122*b* of inventory data 125 maps to two prices 112, 113 in the price data 115 is also embodied in a software program, and the program may include functionality for displaying both prices 112, 113 on the client computer 102.

Price data 115, estimate 150, items 122 of inventory data 125 or supplemental inventory data 128 may be displayed on a screen of client 102 by downloading a web page with a browser via a display module 166 implemented as a compiled program embedded in the web page and executed within a client process with substantially unrestricted access to the system resources of client 102.

Estimate 150 of the cost of settling a claim may be organized by room, but it may also be organized by product category, by locality, by peril, or by any equivalent category.

Figure 5:
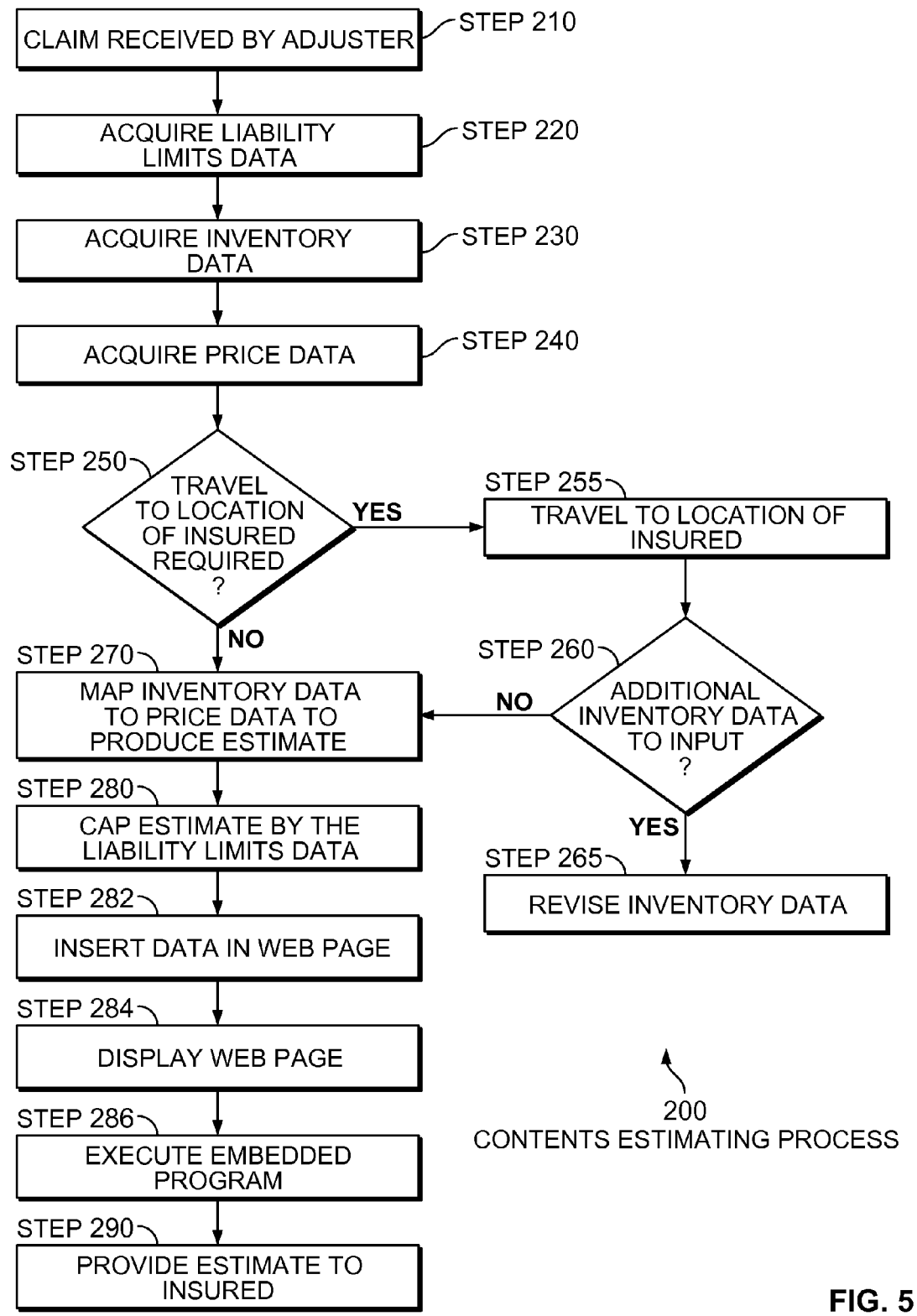
FIG. 5 is a flow chart of a contents estimating process 200 according to an embodiment of the present invention.

FIG. 5 shows a flow chart of a contents estimating process 200 according to an embodiment of the present invention. At step 210 a claim may be received by an adjuster. Step 220 shows liability limits data being acquired. Step 230 shows inventory data being acquired. Step 240 shows price data being acquired. Step 250 queries whether travel to the insured's location or to the location of the loss will be necessary. If so, Step 255 shows travel to the insured's location or to the location of the loss. Step 260 queries whether additional inventory data needs to be input. If so, the additional inventory data may be used to revise the original inventory data at Step 265. At step 270 an estimate of the cost of settling the claim may be produced by mapping the items of the inventory to the price data acquired in step 240. At step 280 the estimate of the cost of settling the claim may be capped by the liability limits data acquired in step 220. At step 282 the liability limits data, the inventory data, the price data, or the estimate are inserted in the web page. At step 284 the web page may be displayed with a browser of a client. At step 286 an embedded program may be executed within a client process with substantially unrestricted access to the client's system resources. The embedded program may be implemented to accomplish one or more functional aspects of the system. As will be described in further detail below, in a preferred embodiment, the embedded program is employed to accomplish certain functionality associated with a display module of the system. And at step 290 the estimate of the cost of settling the claim may be provided to the insured.

In step 220, the liability limits data may be retrieved from a database, downloaded from a web site, input, read from a file, received from a transmitter, derived, fabricated, or acquired by any equivalent means. In another embodiment, the liability limits data acquired in step 220 are available locally on the client for untethered operation.

In step 230 the inventory may be input at the insured's location or at the location of the loss, or it may be received with a claim, retrieved from a database, downloaded from a web site, input, read from a file, received from a transmitter, derived, fabricated, or acquired by any equivalent means.

In step 240 the price data may be retrieved from a database, downloaded from a web site, input, read from a file, received from a transmitter, derived, fabricated, or acquired by any equivalent means. The price data retrieved in step 240 may be regional price data, national price data, global price data, manufacturer's suggested retail price data, economic value data, future price data, historical price data, equivalent item price data, complementary item price data, wholesale price data, retail price data, replacement cost, cleaning expense, repair expense, or any equivalent form of valuation. In another embodiment, the regional price data in step 240 may be selected based on the insured's zip code.

In one embodiment the estimate of the cost of settling a claim produced in step 270 may be organized by room, but it may also be organized by product category, by locality by peril, or by any other convenient category.

Figure 6:
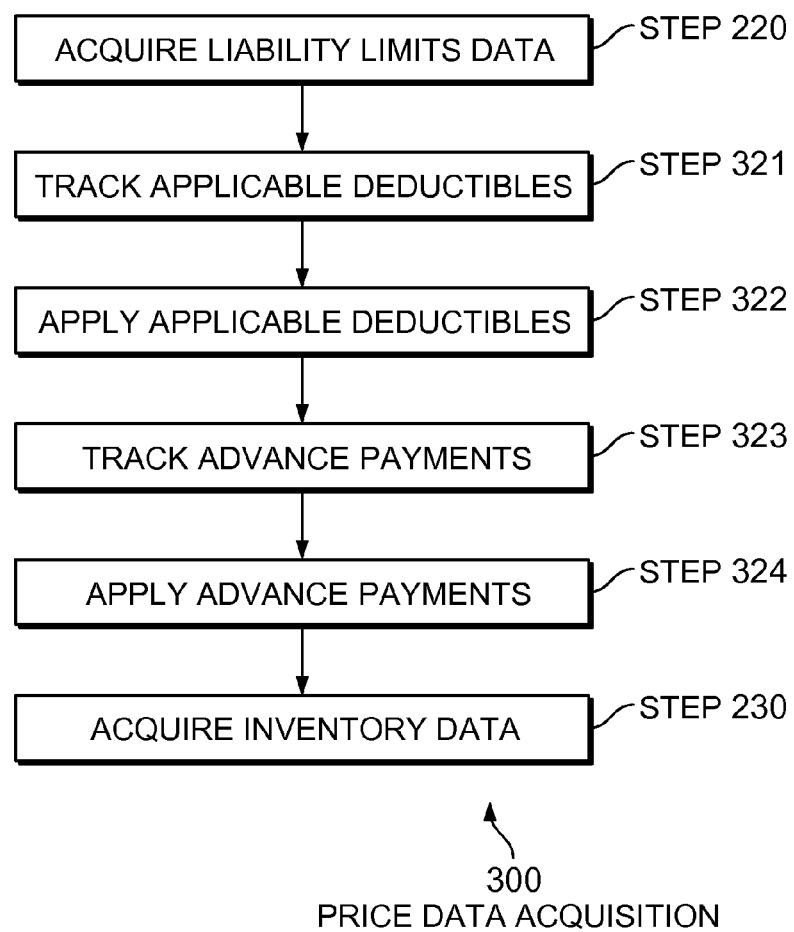
FIG. 6 is a flow chart of further steps associated with liability limits data acquisition step 220 according to the embodiment shown in FIG. 5.

In an alternate embodiment, as shown in FIG. 6, step 220, in which liability limits data are acquired, further includes step 321 for tracking applicable deductibles, step 322 for applying the applicable deductibles, step 323 for tracking advance payments, and/or step 324 for applying the advance payments.

In one embodiment the deductible to which steps 321 and 322 refer may be based on an applied category limit or sub-limit, which may be applied automatically. In another embodiment the applied category limit or sub-limit may be defined by a peril code. In another embodiment a policy type defines the applied category limit or sub-limit. The applied category limit or sub-limit may, alternatively, be overridden.

Figure 7:
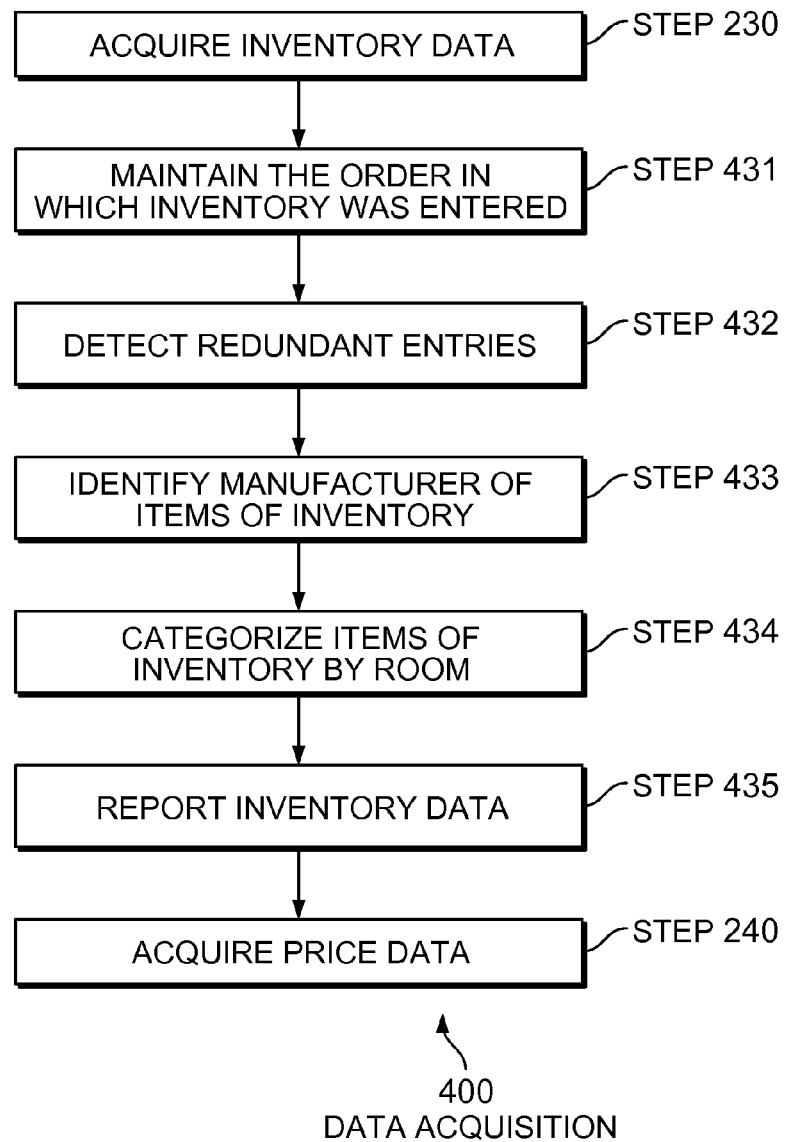
FIG. 7 is a flow chart of further steps associated with inventory data acquisition step 230 according to the embodiment shown in FIG. 5.

As shown in FIG. 7, step 230, in which the inventory data is acquired, further includes step 431 for maintaining the order in which each item of the inventory was entered, step 432 for detecting redundant item entries, step 433 for identifying the product manufacturer of the item of the inventory, step 434 for categorizing an item of the inventory by a room (or other applicable category), and/or step 435 for reporting the inventory.

The identifier used in step 433 to identify the product manufacturer of the item of the inventory may be a vendor-specific identifier, a serial number, a brand, a model, a year, a feature, a price, a description, an image, a bar code, a label, a component, or any other convenient characteristic.

The inventory acquired in step 230 may be available locally on the client for untethered operation.

In one embodiment a result of a regression analysis, such as a linear extrapolation based on historical data, may be reported in reporting step 435, but a claim frequency, a claim history, a payout history, a default history, similar claims in the same locality, similar claims by similar businesses, claims by peril, a complementary item, a supplementary item, trend analysis, most common loss items, measurement of savings, history per estimate, or any other relevant statistic may be reported.

Figure 8:
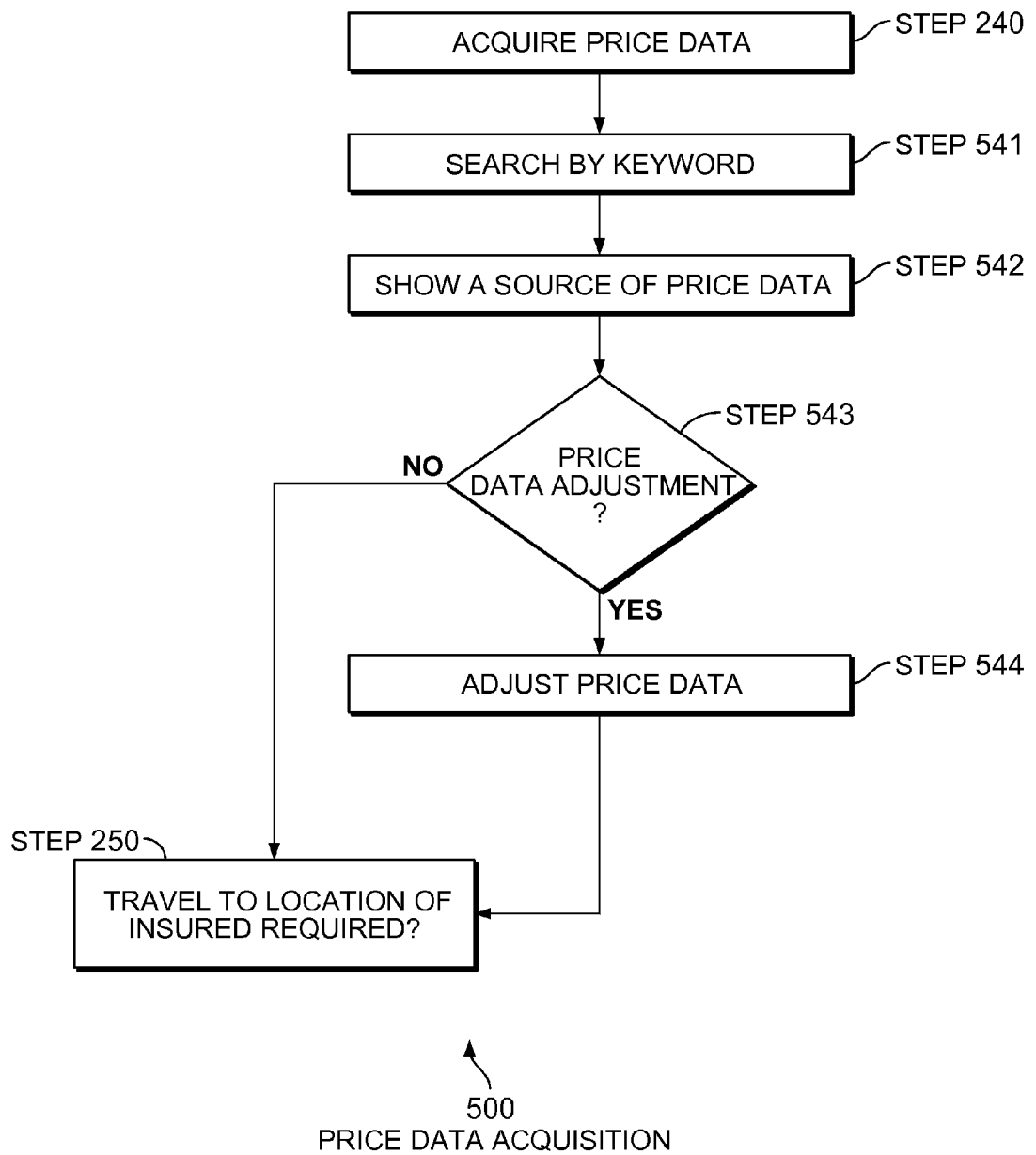
FIG. 8 is a flow chart of further steps associated with price data acquisition step 240 according to the embodiment shown in FIG. 5.

As shown in FIG. 8, step 240 may further include step 541 of keyword searching and/or step 542 in which a source of the price data may be shown. The source of price data shown in step 542 may include information such as vendor name, vendor identification number, vendor address, vendor phone number, or any other equivalent characteristic. In another embodiment, step 240 further includes step 544 in which the price data may be adjusted using a factor, such as, age-based depreciation, usage-based depreciation, cost-based depreciation, taxable status such as tax rate, or any other equivalent factor. In another embodiment, step 240 further includes a step 543, preceding step 544, in which price data adjustment step 544 can be overridden.

The taxable status factor used to adjust price data in step 544 may be based on ACV, but it may also be based on FRC, market value, local regulations, municipal regulations, state regulations or any other applicable parameter. In another embodiment, the taxable status used in step 544 may be determined based on the insured's zip code. In another embodiment, the price data acquired in step 240 may be available locally on the client for untethered operation.

Figure 9:
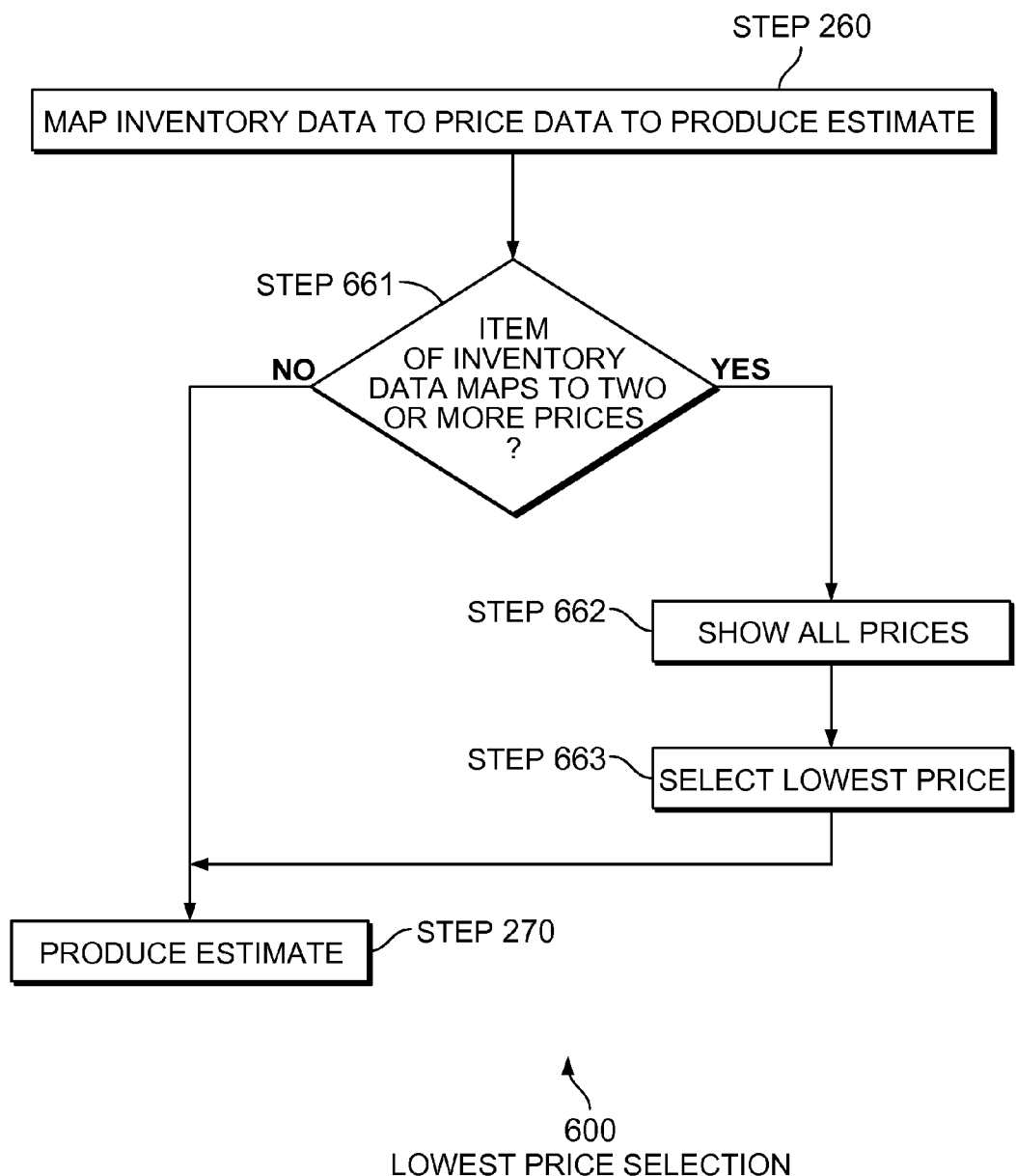
FIG. 9 is a flow chart of further steps associated with mapping step 260 according to the embodiment shown in FIG. 5.

As shown in FIG. 9, estimating step 260 further includes step 661 of determining whether an item of inventory maps to two or more prices. If so, all of those prices are shown in Step 662, and the lowest price may be selected in Step 663. Alternatively, and preferably, the claims adjuster may have the discretion to select whichever of the two or more options that will most satisfy the customer. For example, the adjuster can select the higher price item, if it can be obtained more quickly to thereby replace the customer's loss more quickly. In another embodiment, estimating step 260 may be based on depreciated value, but settlement options such as replacement cost, an allowance towards replacement, cleaning, repair, the ACV, the FRC, or any equivalent settlement option, may also be used. In another embodiment, estimating step 260 further includes storing the estimate.

Figure 10:
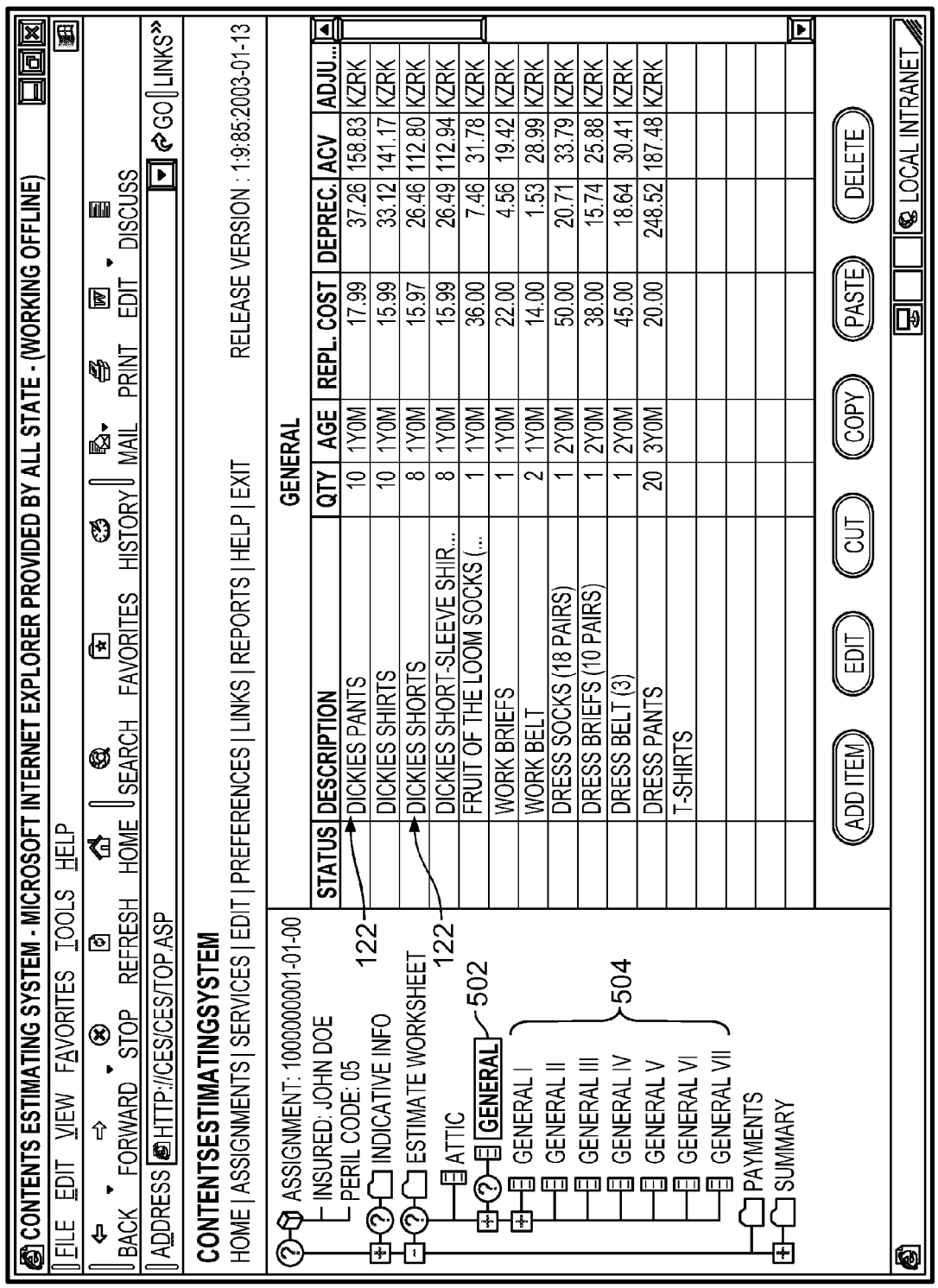

A large claim, such as, e.g. a fire claim, may require several thousand items 122 to be listed. A claim may be organized into damage areas 502 listed on a navigation tree 504 to be recorded and displayed, via a display module, on, for example, a web page as shown in FIG. 10. A damage area 502 may correspond to, e.g. a room of a house or a category of items. Each damage area 502 may, by itself, contain several hundred or thousand items 122, as in the case of a large fire claim.

Items 122 may be entered into client 102 via a mouse, a keyboard, a bar code reader, or a voice recognition system and displayed on a screen of client 102. A list of items 122 associated with various damage areas may be displayed as a web page in, e.g. hyper text markup language (HTML) format. HTML pages may grow as items 122 are added.

It may further be important to maximize the user-friendliness, transparency, and accessibility of the system by providing a very rich and dynamic user interface for client 102 for purposes of user functionality. Such an interface may result in large and complicated HTML pages. It may take a significant period of time for a web browser like, e.g. Internet Explorer® to render a large HTML page in the first instance. An entire page may further have to be re-rendered, every time a new item 122 may be added.

Displaying, modifying, adding to, or updating several thousands of items 122 may not be easy to do in practice. Accordingly, an application designed to work well with claims entailing a smaller number of items 122 may encounter memory and performance problems when processing large claims.

HTML pages may be created using the information in an extensible markup language (XML) assignment file. Such pages may be designed using JavaScript code by transformation of XML files with extensible style sheet language (XSL). HTML pages are rebuilt when a user modifies the list of items 122.

Rebuilding a page every time the user modifies an entry consumes a lot of resources if the files are large. In one instance; a process memory footprint of over 100 MB was observed while a page was being rebuilt. Furthermore, HTML pages may need to be created dynamically, i.e on the fly. The dynamic creation may take place at the time the claims adjuster inputs the claim information. The dynamic creation may also take place when a user requests a particular page.

A computer process may become unstable or stop responding if it runs out of memory. If an embedded program is sandboxed, it may use up its allowed address space before client 102 has actually run out of memory. If, a large number of items 122 were entered in a single damage area the application response may become very slow. As more items 122 are added it may eventually stop responding entirely. A computer process may be also at a particular risk of running out of memory if other applications are running concurrently, as is often the case.

One solution would be to limit the number of items 122 entered in a particular damage area to no more than one hundred of items 122 per damage area. Limiting the number of items 122 in any particular damage area may, however, require a user to break a single room into multiple damage areas. Multiple damage areas may consequently require more time be spent navigating across damage areas. Another solution would be to leave a first damage area in a list of damage areas empty, to expedite loading of an initial assignment. An assignment is the task given to a damage adjustor to estimate the amount of a claim.

As will be described in further detail below, in order to accommodate estimates involving a large amount of inventory data, certain HTML pages within the system may contain an embedded program such as, e.g. an applet or a component object model (COM) module or component. Embedded programs may allow a user to enter items 122 plus offer interactive help for entering items 122.

Figure 11:
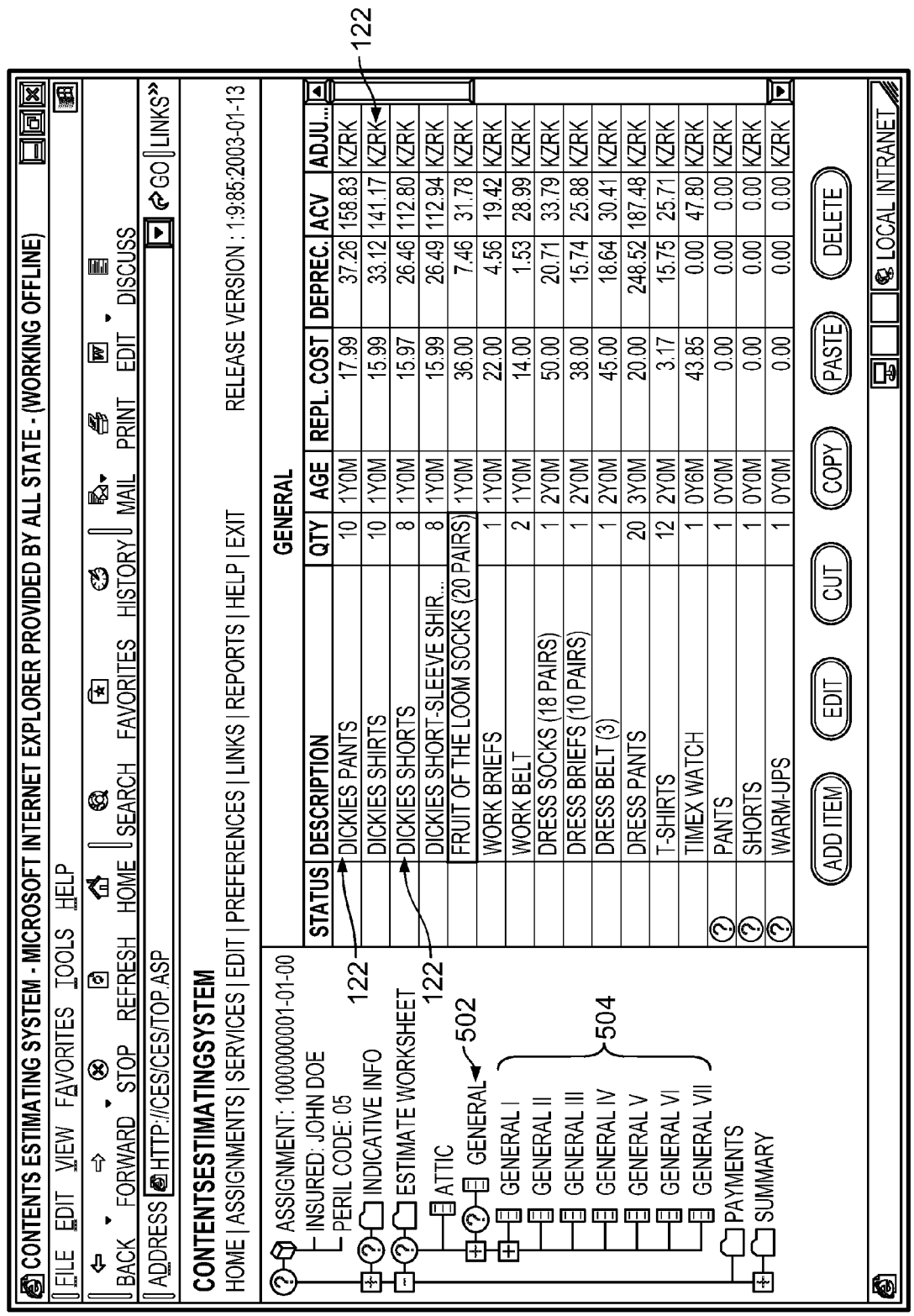

The embedded program may also function to repaint or modify the display and perform other functions associated with the web page. In one embodiment an embedded program may offer information and tips to show a complete description of a selected item 122 if such description is partially clipped by a frame border or a column border, as shown in FIG. 11.

COMs written in C++ and, to a lesser extent, JAVA applets have more access to system resources than programs written using JAVA Script. Thus, in the context of the present invention, COMs can achieve faster operation times and more efficient memory management, especially in circumstances in which a claim estimate involves a large number of claim items.

An embedded program may be compiled elsewhere and imported into client 102 to run within the client process. An embedded program may have all of the rights and privileges of a user process while it may be running, such as the ability to read, write, erase, or encrypt a user's disk files, email data or copies of itself to remote locations, etc. An embedded program may therefore pose a security risk.

Even embedded programs from safe sources may pose risks to client 102 if they were to do inadvertent or unexpected damage to client 102. Not all platforms and combinations of software perform in an exactly predictable manner. An operation that may be safely broadcast to one set of platforms may reveal unexpected bugs on another, similar set. Thus one reason to restrict the access of embedded programs running on a client 102 may be to guard against unexpected results.

Different technologies use different means to control the risk. Java Script has built-in limitation on programmatic access to the computer resources thus reducing the risk to a very low level. Java does not have built-in limitations however the technology called "sandboxing" may be used to limit the applet's access to the computer resources. These restrictions however also limit the program's ability to effectively use computer resources.

COM modules or component s embedded in the Web page do not have any access restrictions. It is a programmer's responsibility to develop the program in a way that ensures safe operation. This increases the risk; at the same time it allows building high performance components that efficiently use computer resources, and including additional features to enhance users experience.

A preferred embodiment involves the use of an embedded program implemented as a COM module or component, e.g. an ActiveX® control. That is, for certain aspects of the functionality of the web page, an embedded program having less security and more robust resource access can improve the performance of those aspects. In the present invention, the functionality for creating the navigation tree 504 and damage view area list 502 is preferably implemented with a compiled code (or a COM) that runs as though it were a native process, such as ActiveX® controls implemented using C++.

ActiveX® technology enables software modules or components to interact with each other in a networked environment, regardless of the language in which the modules or components were created. Thus, the controls for achieving the functionality for the creation of the navigation tree 504 and damage area list 502, which are compiled C++ programs, can interact with other aspects of the web page that are not implemented using COM and/or C++, and may use, for example, JAVA Script. In this embodiment a compiled code may be inserted in the web page and runs in binary on client 102, with all of the privileges and access of a user process.

The ActiveX® controls for the navigation tree and the damage view area provide the same functionality as the HTML pages they replaced, but provide more robust performance while working with claims of up to 5000 line items (the largest claim tested). Rendering of a damage view area list containing 1000 line items was observed to be about 50 times faster when using ActiveX® controls using C++ than with an HTML page.

Using a compiled code such as ActiveX® controls implemented using C++ provide more effective memory management ability than HTML running JavaScript. C++ provides very effective memory management. C++ may also provide granular access to the screen, i.e. when information is modified, only the area of the screen that contains the changes needs to be repainted.

User experience enhancements can be achieved by implementing a process on client 102 as multithreaded. Multithreading means alternating between processes, such as repainting a screen or inputting data, alternately, rather than waiting for one process to complete before starting the next.

In the present invention, multithreading is facilitated by the use of COMs written in C++ and ActiveX controls. Multithreading allows the performance of the remote contents estimating system 100 to be improved by displaying items 122 in the damage area list 502 as they are added, allowing a user to switch to any of items 122 already shown in damage area 502 without waiting for the rendering to be complete, or allowing a user to switch to another damage area 502 before the currently selected one may be completely rendered. Thus, perceived speed of the system is enhanced because of the improvements in presentation speed and responsiveness that are achieved via multithreading.

As noted, ActiveX controls written in C++ allow using multiple threads. In the Damage Area View, control while the secondary thread extracts information from a file and places it into the screen buffer the UI (User Interface) thread repaints the screen. As the result, a user starts seeing the information on the screen right after she clicks the mouse.

Figure 12:
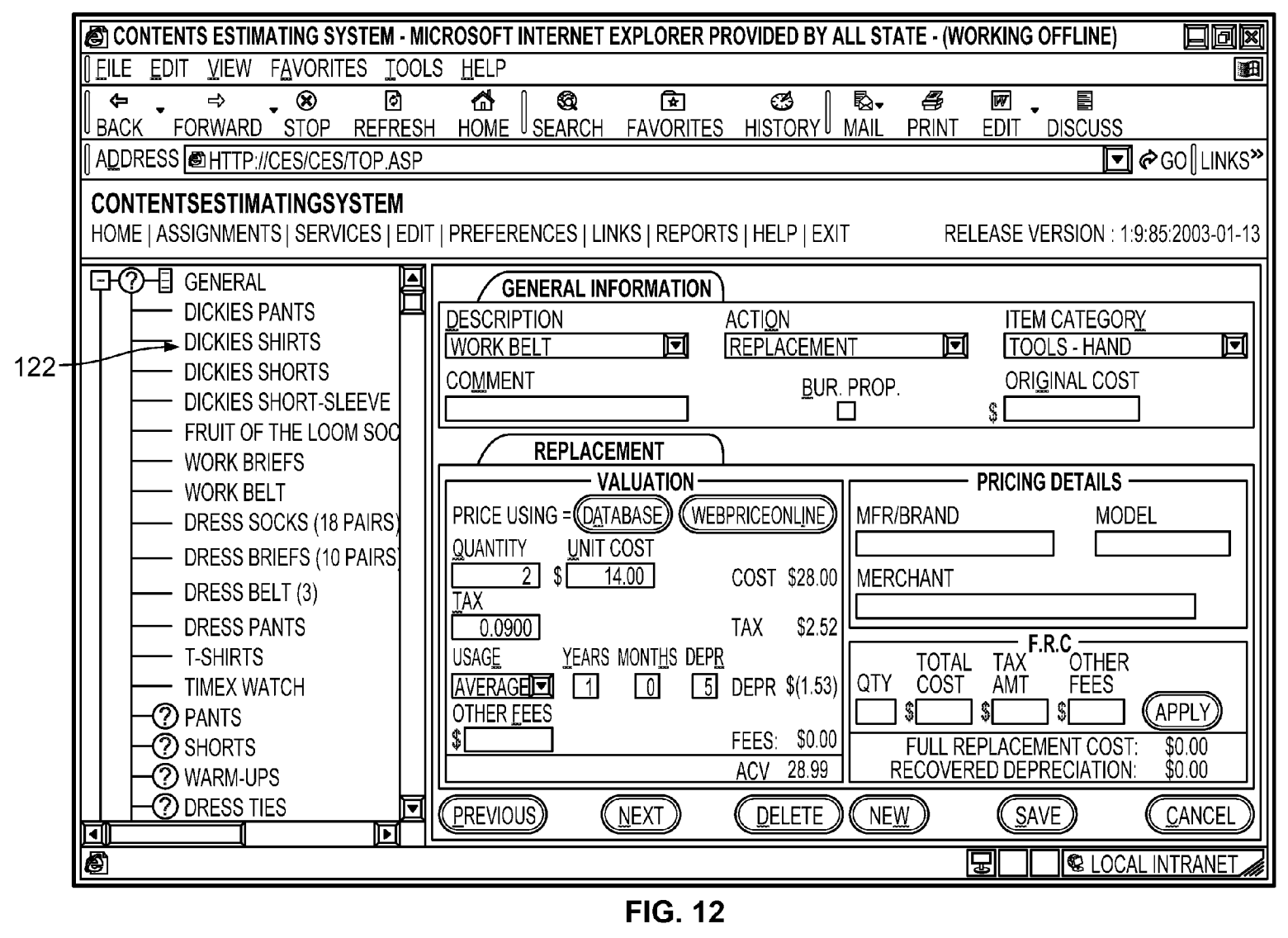

FIG. 10 shows a screen shot with the list of line items in the Damage Area being populated. As a reference, FIG. 11 shows the populated list of line items. Besides, the application remains responsive—if a user clicks on another Damage Area icon on the tree, the population process immediately restarts for that Damage Area. Also, a user can double click on any line item that is already displayed (i.e. any one seen on FIG. 10) and the Line Item View will appear right away (FIG. 12).

In one embodiment, a user interface (UI) thread repaints the screen of client 102 showing damage area 502 while a secondary thread extracts information from a file and places it into a screen buffer. As the result, a user starts seeing the information on the screen right after she clicks the mouse on an input field. In FIG. 10 is shown a screen shot with the list of items 122 in damage area 502 being populated. FIG. 10 also shows the populated list of items 122.

If a user clicks on another damage area 502 icon on the navigation tree 504, the population process may restart immediately for that damage area 502 if the process were multithreaded. Also, a user can double click on any item 122 that is already displayed (i.e. any one seen on FIG. 10) and the Line Item View will appear right away (FIG. 12).

Applications written in C++ also allow granular access to the screen. If a user modifies a description of an item 122 in the right hand pane of FIG. 12, (e.g. changes "Work Belt" in the Description field to something else) and then tabs out, this change may be saved implicitly, and the label of the corresponding tree node should be updated. In this case the new description of item 122 may be passed to the Tree Control and only the label area may be repainted (the gray rectangle on FIG. 12). This may be more effective than rebuilding and re-rendering an HTML page within a Tree Frame. The same consideration may be applicable to expanding a tree node, adding a new damage area 502, etc.

The functionality described herein can be implemented by software comprising a plurality of instructions stored on a computer readable medium, which instructions, when executed by a computer system, will cause the computer system to implement the functionality described above.

The invention having been thus described, it will be apparent to those skilled in the art that the same may be varied in many ways without departing from the spirit and scope of the inventions. All such modifications are intended to be encompassed by the following claims.

What is claimed is:

1. A computer-implemented method comprising:
receiving a loss claim at a client device, the loss claim corresponding to inventory data comprising a list of a plurality of items lost in an event resulting in the loss claim;
receiving liability limits data for the loss claim from a claim processing server;
receiving inventory data for the list of the plurality of items;
receiving price data for the list of the plurality of items from the claim processing server, wherein the price data is adjusted by a taxable status adjustment factor that is determined based on at least one of an actual cash value (ACV) and full replacement cost (FRC) of each of the plurality of items;
storing the liability limits data, the inventory data, and the adjusted price data in a memory of the client device;
using a claims processor associated with the client device, mapping each item of the list of the plurality of items to the adjusted price data to determine an estimated cost of replacement for each item, wherein the mapping comprises selecting a lowest price for a first item when the first item of the plurality of items maps to a plurality of prices of the adjusted price data in the memory of the client device;
calculating, using the claims processor, an estimate of a cost of settling the loss claim based on a sum of the estimated costs of replacement of each item;
using the claims processor, capping the estimate by applying the liability limits data;
using a display device associated with the client device, outputting the estimate to a web page; and
using the claims processor, settling the loss claim by taking into account a difference between an actual cash valuation (ACV) and a full replacement cost (FRC) of the plurality of items.

2. The method of claim 1, comprising:
- updating the inventory data in the memory based on receiving input describing additional items related to the loss claim;
- revising the list of the plurality of items to include the additional items related to the loss claim in the memory;
- using the claims processor, mapping each item of the revised list to the adjusted price data to determine an estimated cost of replacement of each item of the revised list;
- using the claims processor, revising the estimate based on the additional items related to the loss claim;
- using the claims processor, capping the revised estimate by applying the liability limits data; and
- using the display device associated with the client device, outputting the revised estimate at a location of said insured to which the loss claim corresponds or a location of the loss claim.

3. The method of claim 2, further comprising uploading the updated inventory data or the revised estimate from the memory of the client device to the claims processing server.

4. The method of claim 2, wherein a portion of a screen of the display device that is affected by one of the updated list, the updated inventory, and the revised estimate is repainted.

5. The method of claim 1, wherein the mapping further comprises showing at least two of the plurality of prices on the display device.

6. The method of claim 1, comprising:
- providing the insured with the estimate at a location of the insured.

7. The method of claim 1, comprising:
- providing the insured with the estimate at a location of the loss claim.

8. A computer-implemented method comprising:
- receiving a loss claim at a client device located at a location of the loss, the loss claim corresponding to inventory data comprising a list of a plurality of items lost in an event resulting in the loss claim;
- receiving liability limits data for the loss claim at the client device;
- receiving inventory data for the list of the plurality of items at the client device;
- receiving price data for the list of the plurality of items at the client device, wherein the price data is adjusted by a taxable status adjustment factor that is determined based on at least one of an actual cash value (ACV) and full replacement cost (FRC) of each of the plurality of items;
- storing the liability limits data, the inventory data, and the adjusted price data in a memory of the client device;
- using a claims processor associated with the client device at the location of the loss, mapping each item of the list of the plurality of items to the adjusted price data to determine an estimated cost of replacement for each item, wherein the mapping comprises selecting a lowest price for a first item when the first item of the plurality of items maps to a plurality of prices of the adjusted price data in the memory of the client device;
- calculating, using the claims processor, an estimate of a cost of settling the loss claim based on a sum of the estimated costs of replacement of each item;
- using the claims processor, capping the estimate by applying the liability limits data; and
- using a display device associated with the client device, displaying the estimate at the location of the loss;
- updating the inventory data in the memory based on receiving input describing additional items related to the loss claim at the location of the loss;
- in the memory of the client device, revising at the location of the loss the list of the plurality of items to include the additional items related to the loss claim; and
- using the claims processor, settling the loss claim by taking into account a difference between an actual cash valuation (ACV) and a full replacement cost (FRC) of the plurality of items and the additional items.

9. The method of claim 8, comprising:
- using the claims processor, mapping at the location of the loss each item of the revised list to the adjusted price data to determine an estimated cost of replacement of each item of the revised list;
- using the claims processor, revising at the location of the loss the estimate based on the additional items related to the loss claim;
- using the claims processor, capping at the location of the loss the revised estimate by applying the liability limits data; and
- using the display device associated with the client device, outputting the revised estimate at the location of the loss.

10. The method of claim 8, wherein the location of the loss is also a location of the insured.

* * * * *